United States Patent [19]
Proctor

[11] Patent Number: 6,078,809
[45] Date of Patent: Jun. 20, 2000

[54] METHOD AND APPARATUS FOR PERFORMING A MULTI-PARTY COMMUNICATION IN A COMMUNICATION SYSTEM

[75] Inventor: Lee Michael Proctor, Cary, Ill.

[73] Assignee: Motorola, Inc., Schaumburg, Ill.

[21] Appl. No.: 09/031,987

[22] Filed: Feb. 27, 1998

[51] Int. Cl.[7] ................................ H04Q 7/38
[52] U.S. Cl. .................. 455/416; 455/524; 455/560; 455/561
[58] Field of Search ........................ 455/416, 417, 455/422, 445, 560, 561, 524; 379/202, 206, 205; 370/260, 261, 262, 263, 264, 265, 266, 267, 268, 289

[56] References Cited

U.S. PATENT DOCUMENTS

| | | | |
|---|---|---|---|
| 5,768,308 | 6/1998 | Pon et al. | 455/560 X |
| 5,793,810 | 8/1998 | Han et al. | 455/422 X |

*Primary Examiner*—Fan Tsang
*Assistant Examiner*—Philip J. Sobutka
*Attorney, Agent, or Firm*—Kenneth A. Haas

[57] ABSTRACT

The present invention provides a method and apparatus for performing a multi-party communication in a communication system (100). The communication system (100) includes a first base unit (203) in communication with a first mobile unit (201) and a second base unit (204) in communication with a second mobile unit (202). The first base unit (203) and the second base unit (204) each include a decoder (213, 214), an encoder (223, 274) and a logic unit (233, 224). A communication is initiated between the first mobile unit (201) and the second mobile unit (202). The decoder (213) and the encoder 223 are bypassed in the first base unit (203) by the speech packets. A need is determined to include a third communication unit (239) in the communication. The third communication unit (239) is added to the communication, and the first mobile unit (201) and the second mobile unit (202) continue to transfer speech packets therebetween by bypassing the decoder (213) and the encoder (223) in the first base unit (203).

27 Claims, 9 Drawing Sheets

METHOD AND APPARATUS FOR PERFORMING A MULTI-PARTY COMMUNICATION IN A COMMUNICATION SYSTEM

FIELD OF THE INVENTION

The present invention relates generally to communication systems, and more particularly to a method and apparatus for performing a multi-party communication in a communication system.

BACKGROUND OF THE INVENTION

Communication systems, such as Code Division Multiple Access (CDMA) systems, facilitate communication between mobile units and landline units. A mobile unit communicates with a Base Transceiver Station, which in turn is connected to a Base Station Controller (BSC) The BSC is connected to a Mobile Switching Center (MSC), which in turn can be coupled with a Public Switched Telephone Network (PSTN). The PSTN provides communication with landline units.

FIG. 1 depicts a block diagram of current three-party conference architecture of a communication system in accordance with the prior art. In a three-party communication including two mobile units 101 and 102 and a fixed unit 103, the decoded message from BSC 105 is sent to a three-party conference circuit 107. The three-party conference circuit 107 includes a plurality of combiners 109 and 110 for combining the messages for output to the users. For instance, the decoded message sent from the originating BSC 105 is sent to a first combiner 109 that outputs to the fixed unit 103 and a second combiner 110 that outputs to the destination mobile unit 102.

In a typical mobile-to-land digital communication call, speech is encoded at the mobile unit prior to transmission to the BSC. The BSC includes a decoder for decoding the mobile encoded message. The decoded speech is then passed to the fixed unit.

For digital mobile unit-to-mobile unit calls, voice is typically encoded prior to transmission by the mobile unit. The encoding is done by speech compression algorithms that are well known in the art. This encoded voice data is typically decoded by the BSC. The decoded voice data is then transmitted to the BSC associated with the destination mobile unit. The decoded voice is encoded by the BSC prior to transmission to the destination mobile unit. This encoding is typically done using the same speech compression algorithms as the transmitting mobile unit. The destination mobile unit receives the encoded voice data, and decodes the voice at a decoder in the mobile unit. The decoded voice is then audibly emitted for the user to hear.

However, voice quality can be severely degraded due to the speech having to pass through multiple speech compression algorithms placed in series. Further, there is increased delay introduced into the system due to the multiple encoding/decoding steps. To alleviate these degradations, a technique called vocoder bypass may be deployed. Vocoder bypass essentially bypasses the decoder in the first BSC and the encoder in the second BSC. The mobile-encoded packets are therefore essentially passed to the other mobile unit without being encoded and decoded.

However, when a third party is added to a call, vocoder bypass cannot be utilized. This is due to the need to sum speech signals together. This summing is not possible with speech encoded packets. Hence when the third party is added to the call, the system must disable vocoder bypass and return to the multiple compression steps, thereby incurring increased voice quality degradation. An additional problem is that the voice quality may be degraded by the speech encoders receiving multiple inputs, since the compression algorithms used in the encoders typically are modeled using a single voice and are often inadequate for multiple speech inputs. In addition, there can be gaps in the audio when switching from vocoder bypass to three-party conferencing.

Consequently, a need exists for a communication system and method for processing three-party conference calls that alleviates the problems associated with the prior art while maintaining voice quality.

DETAILED DESCRIPTION OF A PREFERRED EMBODIMENT

The present invention provides a method and apparatus for performing a multi-party communication in a communication system. The communication system is preferably a digital communication system that includes a first base unit in communication with a first mobile unit and a second base unit in communication with a second mobile unit. The first base unit and the second base unit each include a decoder, an encoder and a logic unit. The method includes initiating a communication between the first mobile unit and the second mobile unit. The speech packets going between the first mobile unit and the second mobile unit bypass the decoder and the encoder in the first base unit. Upon determining a need to include a third communication unit in the communication, the third communication unit is added to the communication. After adding the third communication unit, the first and second mobile units continue to transfer speech packets therebetween by bypassing the decoder and the encoder in the first base unit.

The present invention provides an apparatus that includes a decoder, circuitry for processing communication signals, an encoder, and a logic unit. The decoder includes an encoded uplink communication signal that is transmitted from a remote unit as an input. The decoder also includes an output comprising a decoded uplink communication signal. The circuitry receives the encoded uplink communication signal and outputs the encoded uplink communication signal for use by cellular infrastructure equipment. The encoder receives an unencoded downlink communication signal and outputs a first encoded downlink communication signal. The logic unit receives a second encoded downlink communication signal and outputs the second encoded downlink communication signal. In this manner, a multi-party call can be accomplished with increased clarity due to fewer encoding and decoding steps being performed on the voice.

Figure 1:
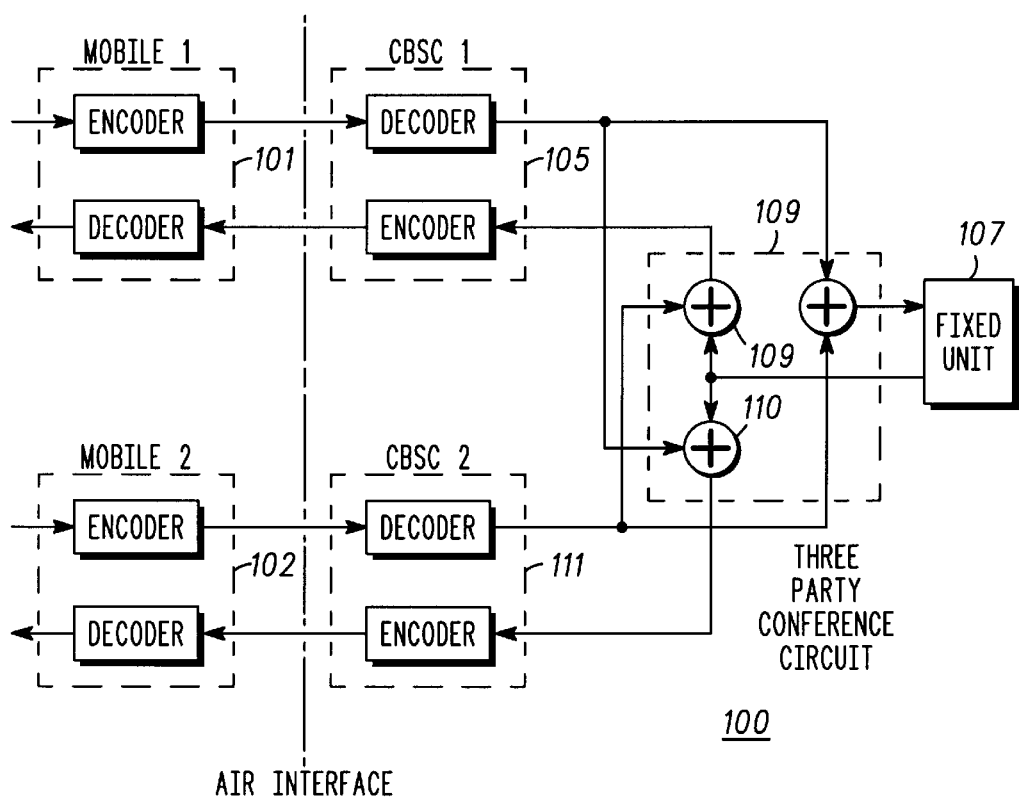
FIG. 1 depicts a prior art three-party conference architecture.
Figure 2:
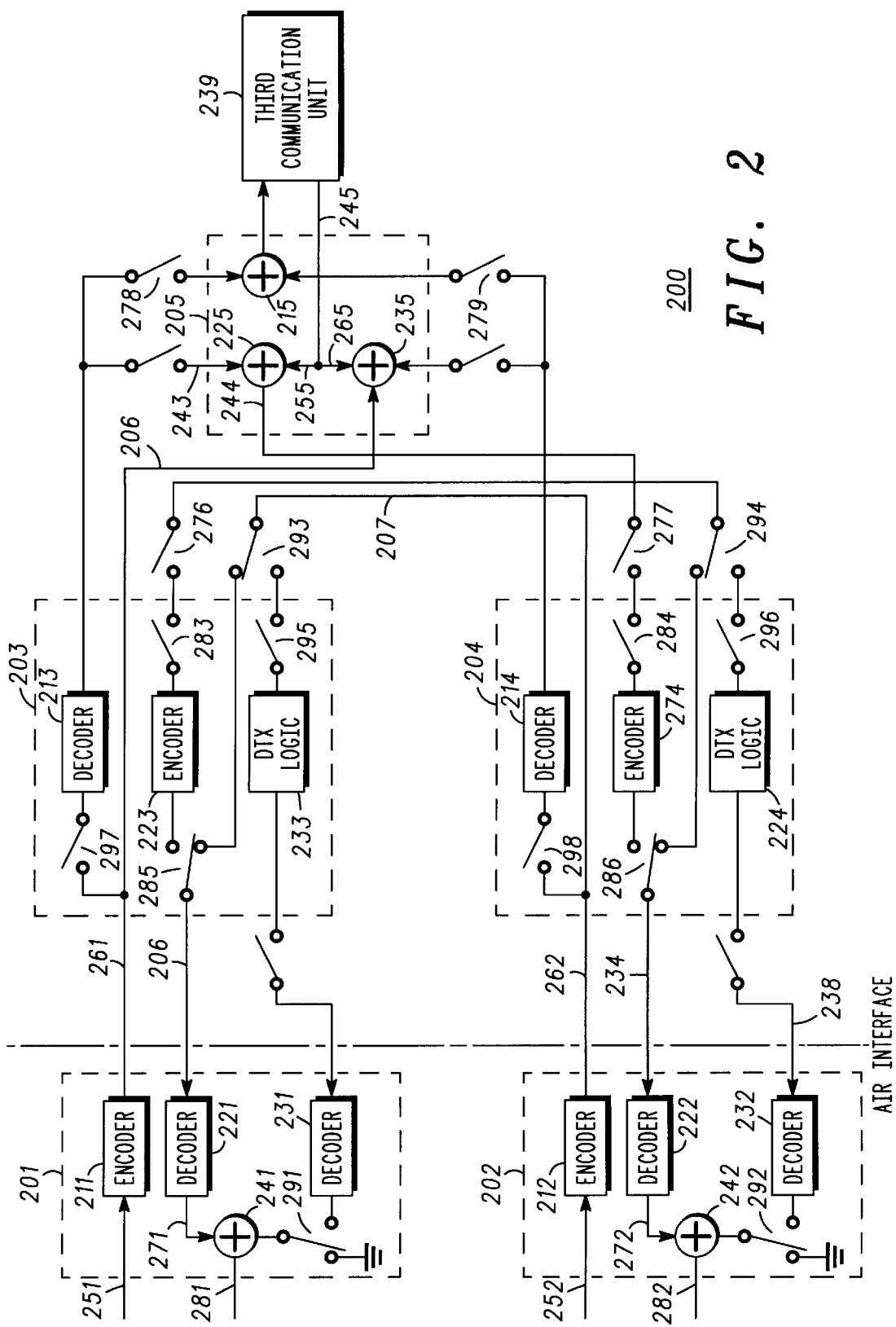
FIG. 2 depicts a three-party conference architecture including a mobile to mobile call prior to including a third-party landline user in accordance with the preferred embodiment of the present invention.
Figure 3:
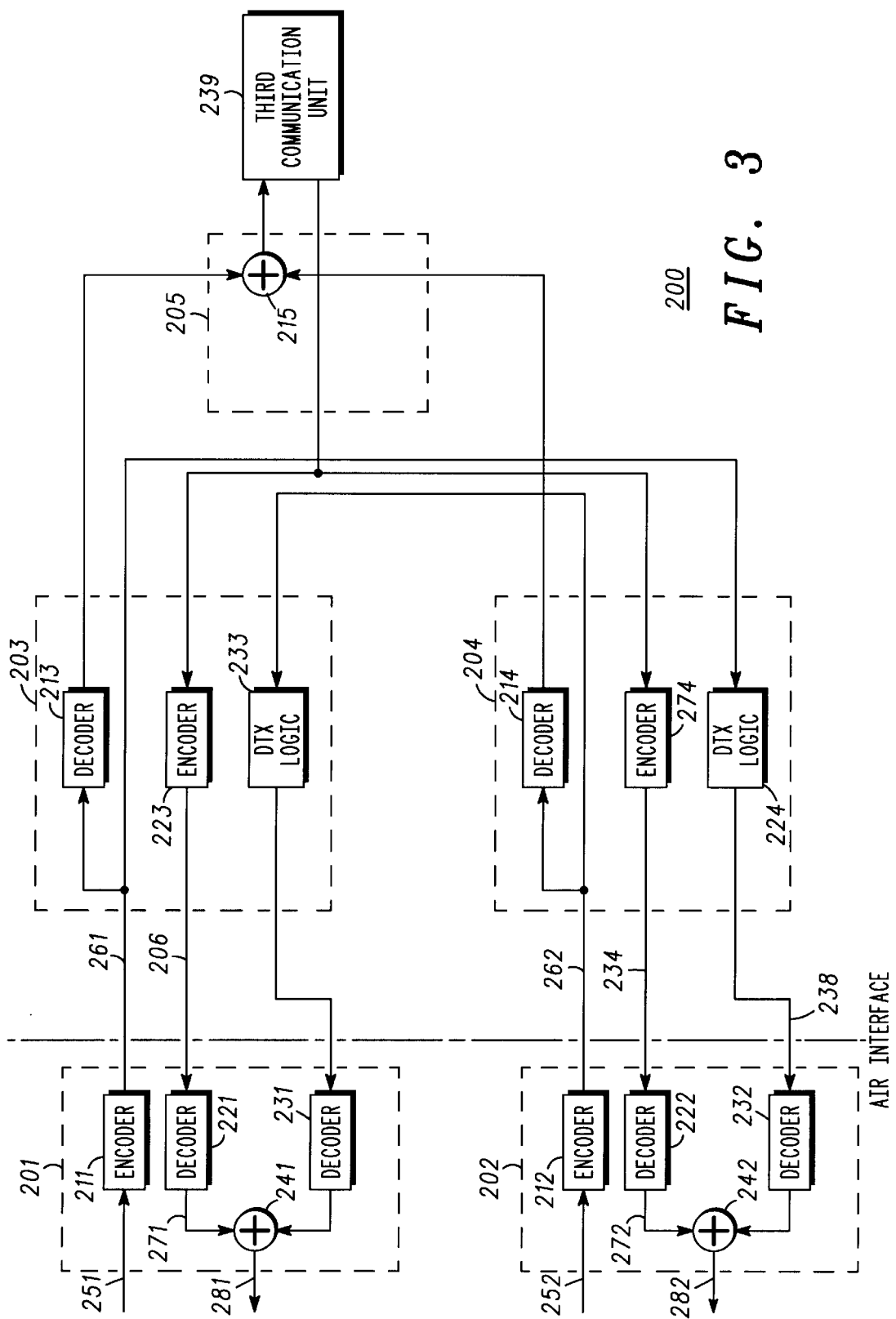
FIG. 3 depicts the three-party conference architecture of FIG. 2 subsequent to including the third-party landline user.

The present invention can be better understood with reference to FIGS. 2–9. FIGS. 2 and 3 depict a three-party conference system 200 in accordance with the preferred embodiment of the present invention. FIG. 2 depicts system 200 after establishing a communication between first mobile unit 201 and second mobile unit 202 but prior to including a third communication unit 239 in the communication. FIG. 3 depicts system 200 subsequent to the addition of third communication unit 239 to the communication. System 200 includes a first mobile unit 201, a second mobile unit 202, a first base unit 203, a second base unit 204, and a three party conference circuit 205. As used herein, the term base unit refers to a channel element in a communication unit, such as a Base Station Controller, that is effective to receive signaling messages from a mobile unit and is able to communicate with other base units, either directly or through other apparatuses, such as a Mobile Switching Center (MSC). Alternately, base units 203 and 204 could be distinct channels in a single BSC. First base unit 203 and second base unit 204 are preferably channels elements is separate Base Station Controllers. In a preferred embodiment, system 200 is a Code Division Multiple Access (CDMA) system. System 200 may also be any digital communication system that includes supplemental air interface channels, such as the next generation CDMA systems.

As depicted in FIG. 2, system 200 depicts a first mobile unit 201 in communication with second mobile unit 202, as is known in the art. First mobile unit 201 encodes voice 251 at encoder 211 and transmits the encoded voice 261 over the air to first base unit 203. This process is well known in the field of digital RF communications. Encoder 211 is preferably a speech encoder. First base unit 203 receives the encoded input 261 and relays the encoded voice to second base unit 204 through link 206. In the preferred embodiment, link 206 connects a first base station controller with a second base station controller. First base unit 203 and second base unit 204 can alternately be separate channels in the same base station controller, in which case link 206 would be an internal link within the base station controller. Second base unit 204 receives the voice data and transmits the encoded voice data 234 over the air to second mobile unit 202. Second mobile unit 202 decodes the encoded voice data at decoder 222 and outputs the decoded voice 282 to the user of second mobile unit 202.

In the same manner, voice data is transmitted from second mobile unit 202 to first mobile unit 201. Voice 252 is encoded at encoder 212 within second mobile unit 202. Encoder 212 is preferably a speech encoder. The encoded voice data 262 is transmitted over the air to second base unit 204. Second base unit 204 sends the encoded voice data over link 207 to first base unit 203. Link 207 preferably connects the first base station controller with the second base station controller. First base unit 203 and second base unit 204 could also be separate channels in the same base station controller, in which case link 207 would be an internal link within the base station controller. First base unit 203 receives the voice data and transmits the encoded voice data 206 over the air to first mobile unit 201. First mobile unit 201 decodes the encoded voice data 206 at decoder 221 and outputs the decoded voice 281 to the user of first mobile unit 201.

First base unit 203 and second base unit 204 are preferably channel elements in "MOTOROLA SUPERCELL" Base Station Controller. First base unit 203 includes a decoder 213, an encoder 223, and Discontinuous Transmission (DTX) Logic 233. Second base unit 204 includes a decoder 214, an encoder 224, and Discontinuous Transmission (DTX) Logic 234. Decoders 213 and 214 receive encoded data, preferably from a first mobile unit 201 and a second mobile unit 202, respectively. Decoders 213 and 214 decode encoded data and output unencoded data, such as voice communications. Encoders 223 and 224 receive unencoded inputs and output encoded outputs. Encoders 223 and 224 utilize well-known speech compression algorithms.

The supplemental air interface channels, as currently designed, can carry full rate primary or full rate secondary data. No signaling information or sub-rate channels are currently feasible on the supplemental air interface channels. Consequently, the supplemental air interface channels operate in a Discontinuous Transmission (DTX) mode. DTX refers to a mode wherein a transmitter is keyed to full power when data is being transmitted, and when data is not being transmitted, is dekeyed. Under DTX mode, no partial keyed transmission is permitted.

DTX Logic Units 733, 734, and 738 are capable of providing discontinuous transmission of a signal. Typical channels in a communication system provide constant transmission of a signal until dekeyed. A control channel, for instance, continually sends out a control signal until a new control channel is selected. When engaged in a voice call, a transmitter in a CDMA base transceiver station is typically keyed up for the duration of the call. DTX Logic units provide for discontinuous transmission of a signal.

DTX Logic unit 233 in base unit 203 receives speech packets from base unit 204. DTX logic unit 224 in base unit 204 receives speech packets from base unit 203. In a CDMA system, the packets are variable rate, meaning that the size of the packets is dependent on the speech activity. A full-rate frame generally corresponds to a user speaking, while eighth-rate frames correspond to silent periods. Other rate frames, namely half-rate and quarter-rate, are also present in a CDMA system. However, the supplemental air interface links only support full-rate frames, where the transmitter is keyed, or zero-rate frames, where the transmitter is dekeyed.

DTX logic units 233 and 224 are responsible for keying and dekeying the transmitter based upon the variable rate packets the DTX logic units 233 and 224 have as inputs. In a preferred embodiment, the transmitter would be keyed for full rate frames and dekeyed for all other rates. In an alternate embodiment, methods include keying for full-rate frames, dekeying for eighth-rate frames, keying for half-rate frames and quarter-rate frames. In the alternate embodiment, the half-rate frames and the quarter-rate frames are padded with null data to form a full-rate frame. Half-rate and quarter-rate frames typically include the tail-end energy of words and sentences. The advantage of the alternate embodiment is that the speech content of half-rate and quarter-rate frames is retained, hence reducing speech clipping effects. A second alternate embodiment is to use an overhang period.

With this method, the transmitter is keyed for all full rates, and when the rate drops below full-rate, the transmitter remains keyed for a fixed number of frames. After the fixed number of frames, the transmitter is dekeyed until the next full-rate frame.

First mobile unit 201 includes an encoder 211, a first decoder 221, a second decoder 231, and a combiner 241. Second mobile unit 202 includes an encoder 212, a first decoder 222, a second decoder 232, and a combiner 242. Encoders 211 and 212 receive data, such as voice, and encode the data, using well-known speech compression algorithms, to prepare the voice data for over-the-air transmission. Decoders 221 and 222 receive encoded data, such as encoded voice communications, and output decoded voice transmission to combiners 241 and 242, respectively. Combiners 241 and 242 are effective to receive decoded voice inputs and combine the inputs prior to outputting a combined decoded output.

Figure 4:
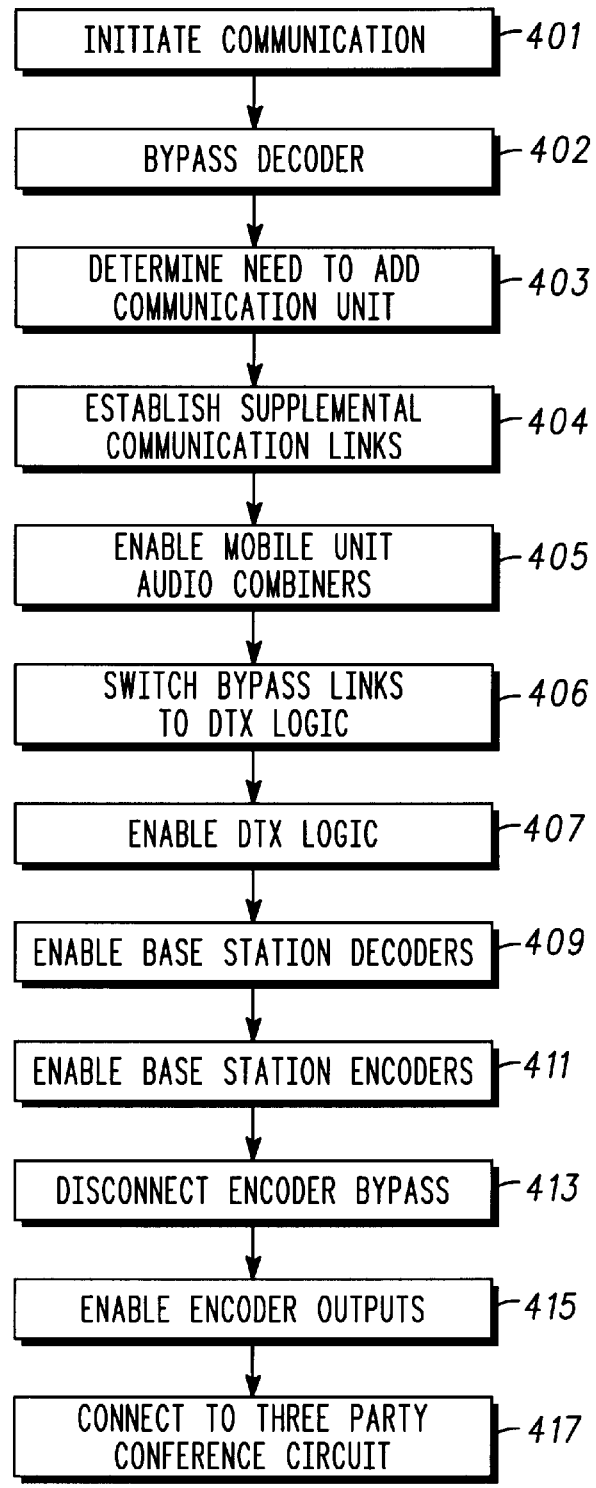
FIG. 4 depicts a flow diagram for including the landline user in a multi-party communication as depicted in FIGS. 2 and 3.

FIG. 4 depicts a flow diagram for including a third communication unit in the multi-party communication as depicted in FIG. 2. A communication is initiated (401) between first mobile unit 201 and second mobile unit 202. The communication is established using well-known methods of establishing a call between mobile users in a communication system. Mobile units 201 and 202 encoded speech packets prior to transmission to base units 203 and 204, respectively. The speech packets bypass (402) decoder 213 and encoder 223 in first base unit 203. A need to include a third communication unit 239 in the communication is determined (403). This determination is preferably made by the first remote unit 201 or the second remote unit 202. Supplemental communication links are established (404) using signaling messages well known in the art. Remote units 201 and 202 enable (405) combiners 241 and 242, respectively, by switching switches 291 and 292 from an open to a closed position. As used herein, open refers to a switch position wherein a signal does not pass through the switch, and closed refers to a switch position wherein a signal is passed through the switch. System 200 switches (406) bypass links 293 and 294 to route voice to DTX Logic units 233 and 224. Base units 203 and 204 enable (407) DTX logic units 233 and 224, respectively, by switching switches 295 and 296, respectively, to a closed position. Stations 203 and 204 enable (409) decoders 213 and 214, respectively, by switching switches 297 and 298 to a closed position. Stations 203 and 204 enable (411) encoders 223 and 274, respectively, by switching switches 283 and 284, respectively, to a closed position. Stations 203 and 204 disconnect (413) encoder bypass by switching switches 285 and 286, respectively, to an open position. Stations 203 and 204 enable (415) encoders 223 and 274, respectively, to output encoded signals 206 and 234, respectively, by switching switches 285 and 286, respectively, to a closed position. System 200 then connects (417) to three party conference circuit 205 by switching switches 276–279 to closed positions.

This process produces, for the duration of the three party communication, the communication system 200 depicted in FIG. 3. In the preferred embodiment, circuit 205 includes a first combiner 215, a second combiner 225, and a third combiner 235. Circuit 205 receives an input voice signal 245, preferably from a fixed communication unit, such as a landline telephone. Signal 245 is preferably an unencoded voice signal. Signal 245 is split to produce signals 255 and 265. Signal 255 is passed to combiner 225, which combines signal 255 with decoded signal 243 generated from first base unit 203. Combiner 225 combines the two signals and outputs a first combined signal 244. Signal 244 is transmitted to second base unit 204, and is encoded by encoder 274 to produce encoded signal 234.

Second base unit 204 transmits signal 234 over the air to second remote unit 202. Second mobile unit 202 receives signal 234, and also receives signal 238 from DTX Logic unit 224 in second base unit 204. Second mobile unit 202 decodes signal 234 at decoder 222, and decodes signal 238 at decoder 232. The decoded outputs from decoders 222 and 232 are combined by combiner 242, and output to the user at output 282.

Three party conference circuit 205 is effective to receive decoded inputs and combine them to produce combined decoded outputs. In a preferred embodiment, circuit 205 includes three combiners 215, 225, and 235, although circuit 205 can include as many combiners as users desire to put together in a conference call. For instance, if the conference circuit includes four combiners, four users could be combined in a conference call, as long as the base units and mobile units include the necessary number of decoders, encoders, and DTX Logic units.

Figure 5:
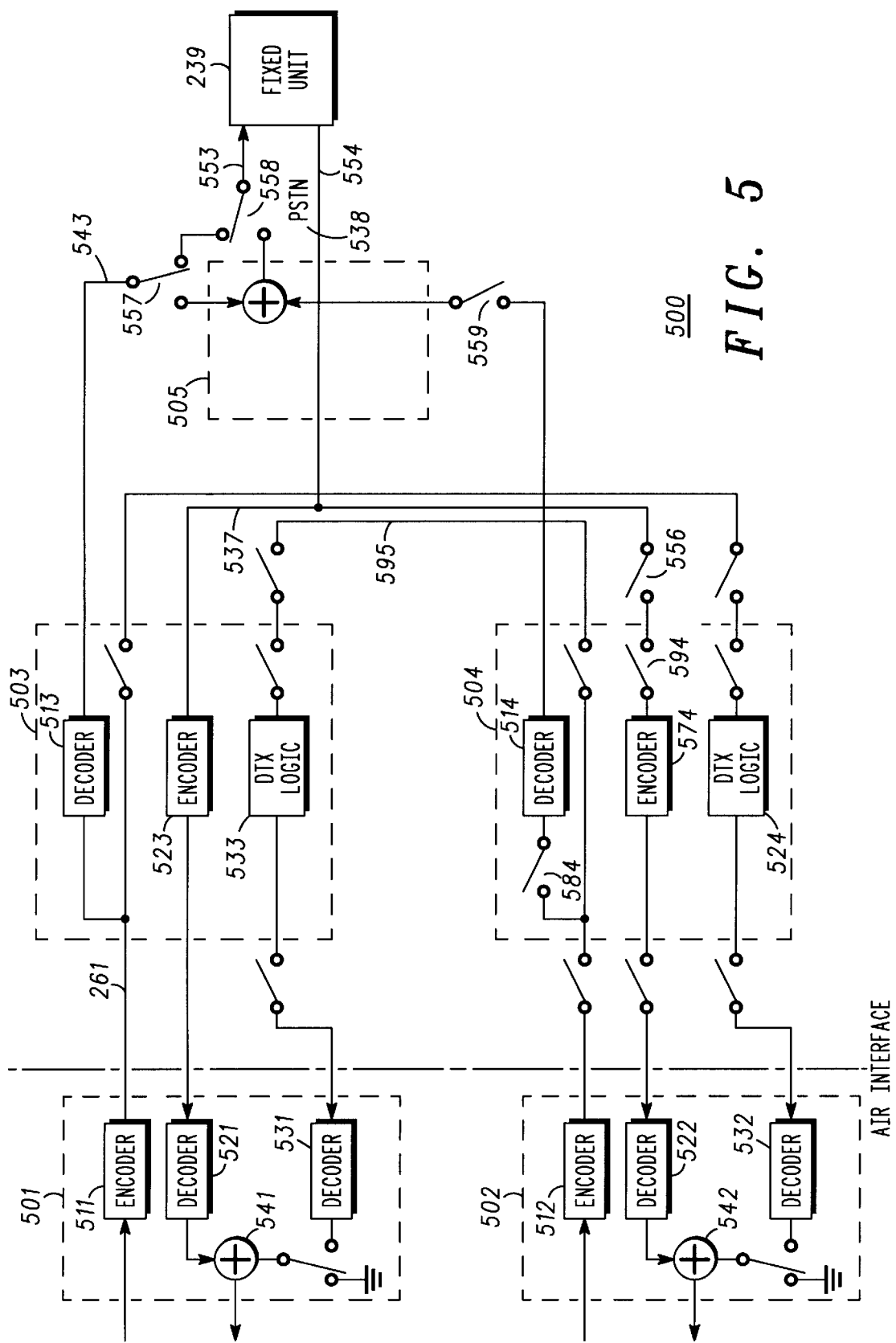
FIG. 5 depicts a three-party conference architecture for including a mobile user as a third-party in a multi-party call in accordance with an alternate embodiment of the present invention.

FIG. 5 depicts a three-party conference system 500 for including a mobile user as a third-party in an existing communication between a mobile user and a fixed user in accordance with an alternate embodiment of the present invention. FIG. 5 depicts system 500 after establishing a communication between first mobile unit 501 and a fixed communication unit 539, but prior to including second mobile unit 202 in the communication. System 500 incudes a first mobile unit 501, a second mobile unit 502, a first base unit 503, a second base unit 504, and a three party conference circuit 505. First base unit 503 and second base unit 504 are preferably base transceiver stations. In a preferred embodiment, system 500 is a Code Division Multiple Access (CDMA) system. System 500 may also be any digital communication system that includes supplemental air interface channels, such as the next generation CDMA systems.

As depicted in FIG. 5, system 500 depicts a first mobile unit 501 in communication with a fixed communication unit 539, as is known in the art. First mobile unit 501 encodes voice 551 at encoder 511 and transmits the encoded voice 561 over the air to first base unit 503. This process is well known in the field of digital RF communications. Encoder 511 is preferably a speech encoder. First base unit 503 receives the encoded input 561 and decodes the encoded voice at decoder 513. The decoded voice is passed to the fixed communication unit 539 bypassing the three party conference circuit 505 through link 543. Fixed communication unit 539 outputs the decoded voice 553 to the user of fixed communication unit 539.

In the same manner, voice data is transmitted from fixed communication unit 539 to first mobile unit 501. Voice data 554 is transmitted from fixed user 539 to first base unit 503 over link 537. Fixed communication unit preferably is connected to a Public Switched Telephone Network (PSTN) 538. First base unit 503 receives the unencoded voice data and encodes the voice at encoder 523. First base unit 503 transmits the encoded voice data 506 over the air to first mobile unit 501. First mobile unit 501 decodes the encoded voice data 506 at decoder 521 and outputs the decoded voice 581 to the user of first mobile unit 501.

First base unit 503 and second base unit 504 are preferably similar to first base unit 203 and second base unit 204 depicted in FIGS. 2 and 3. First mobile unit 501 and second mobile unit 502 are similar to first mobile unit 201 and second mobile unit 202 depicted in FIGS. 2 and 3.

Figure 6:
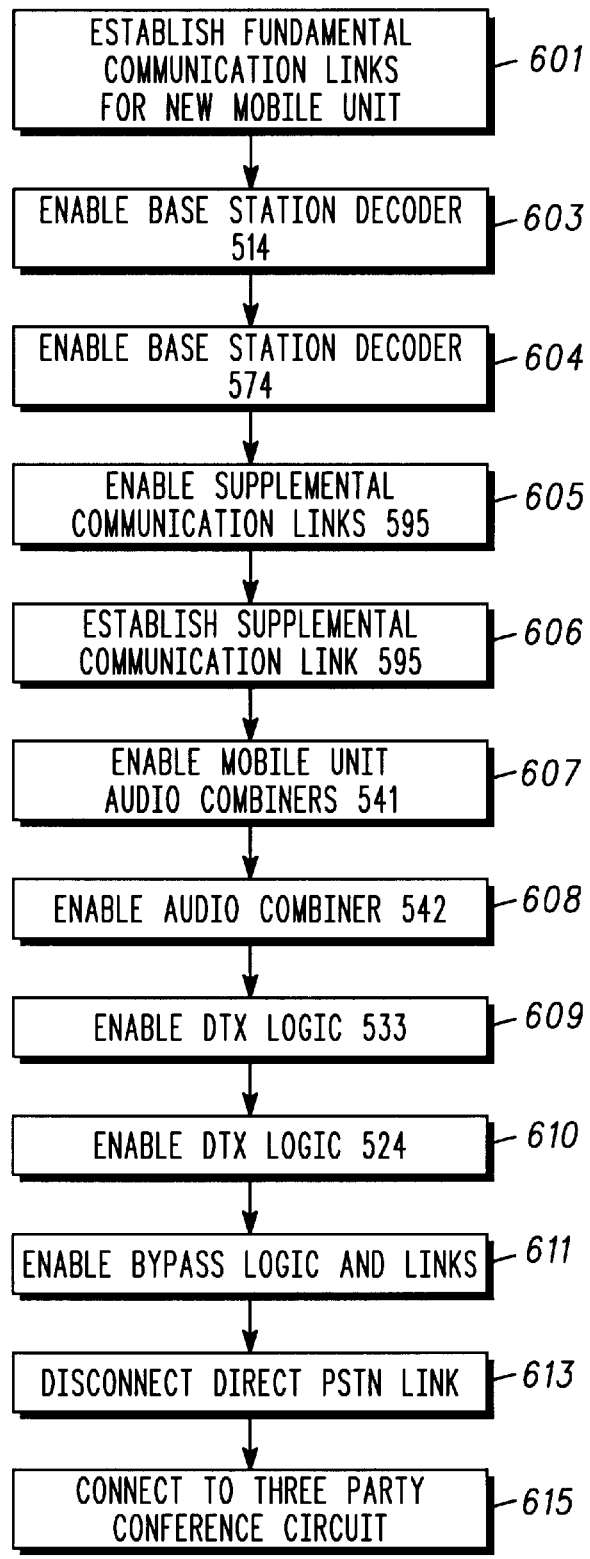
FIG. 6 depicts a flow diagram in accordance with the architecture of FIG. 5.

FIG. 6 depicts a flow diagram for including second mobile user 502 in a multi-party communication in accordance with the alternate embodiment as depicted in FIG. 5. In this embodiment, mobile unit 501 and fixed landline user 539 are involved in a communication and desire to add mobile unit 502 in their communication to form a three-party communication. Mobile unit 502 establishes (601) communication links with base unit 504 using signaling messages well known in the art. Base unit 504 enables (603) decoder 514 by switching switch 584 to a closed position. Base unit 504 enables (604) encoder 574 by switching switch 594 to a closed position. System 500 establishes (605) supplemental communication link 595 using signaling messages well known in the art. System 500 establishes (606) supplemental communication link 595 using methods well known in the art. First remote unit 501 enables (607) combiner 541 by switching switch 251 to a closed position. Second remote unit 502 enables (608) combiner 542 by switching switch 351 to a closed position.

First base unit 503 enables (609) DTX Logic unit 533 by closing switch 252. Second base unit 504 enables (610) DTX Logic Unit 524 by closing switch 352. System 500 enables (611) bypass logic by closing switches 253, 254, 353 and 354. System 500, upon completion of the previous steps, disconnects (613) the direct PSTN link and connects (615) to three party conference circuit 505 by switching switches 556–559.

This embodiment provides a three-party communication by adding a mobile user to a communication already in progress between a mobile user and a fixed landline user. During the original communication between the first mobile unit and the fixed landline user, voice is encoded by the first mobile unit prior to be transmitted over the air to the first base unit. The first base unit receives the encoded voice, decodes it, and sends it to the fixed landline user through the PSTN. Similarly, voice generated by the fixed user is sent through the PSTN to the first base unit. The first base unit encodes the voice from the landline user prior to transmitting the voice over the air to the first mobile unit. The first mobile unit receives the encoded voice, decodes the encoded voice at a decoder within the remote unit, and emits to the user the decoded voice from the fixed landline user.

To add a second mobile unit to the communication to form a three-party communication, the first base unit splits the encoded voice received from the first mobile unit to form a first voice branch and a second voice branch. The first voice branch is sent to a decoder in the first base unit, and the decoded voice is transmitted to the three party conference circuit. The second voice branch is sent to the second base unit. The second base unit receives the encoded voice, passes the encoded voice through the DTX Logic Unit, and transmits the encoded voice over the air to the second mobile unit.

The second mobile unit performs similar functionality upon voice to be transmitted to the first mobile unit and the fixed landline user. The second base unit splits the encoded voice received from the second remote unit to form a first voice branch and a second voice branch. The first voice branch is sent to a decoder within the second base unit, is decoded and transmitted to the three-party conference circuit. The second voice branch is not decoded and is sent to the first base unit. The first base unit processes the second voice branch at the DTX Logic Unit and transmits the encoded voice to the first remote unit.

First base unit 503 and second base unit 504 are preferably different channel elements in different base station controllers, although base units 503 and 504 may alternately be separate channels in the same base station controller.

The three party conference circuit receives the first voice branch from the first remote unit and the first voice branch from the second remote unit and combines them at a combiner located therein. After combining the two decoded voice signals, the three-party conference circuit sends the unencoded voice to the fixed landline user.

The three-party conference circuit receives voice from the fixed landline user. The three-party conference circuit splits the voice to form a first voice branch and a second voice branch. The three-party conference circuit sends the first voice branch to the first base unit and the second voice branch to the second base unit. The first and second base units receive the unencoded voice from the landline user and encode the voice before transmitting over the air to their associated mobile units.

The mobile units receive a first encoded voice signal directly from the other mobile unit, and an encoded voice signal from the fixed landline user. The mobile units each include two decoders. The first decoder decodes the encoded voice sent from the other mobile unit, and the second decoder decodes the voice sent from the landline user and encoded at the first base unit. The two decoded outputs are then combined by a combiner within the mobile unit, and the combined, unencoded output is emitted by the mobile unit.

In a further alternate embodiment, one decoder can be used. The decoder first decodes a speech packet from the other mobile unit and stores the resulting output. The decoder then decodes a speech packet from the landline user and stores the resulting output. The combiner then sums the two stored outputs together.

The three-party conference circuit receives the decoded voice from the first base unit and the second base unit. The three-party conference circuit combines the two decoded voice signals, and sends the combined signal to the PSTN for transmission to the fixed landline user.

In this manner, this embodiment of the present invention provides for higher quality voice quality when making a three-party communication. This quality is achieved by eliminating one of the encoding/decoding steps done by prior art three-party conference circuits. This is accomplished by splitting the encoded voice received at the base units from the mobile units, and passing the encoded voice to the other base unit without decoding it. The other base unit uses DTX logic to transmit the encoded signal to the mobile unit. The present invention is facilitated by utilizing supplemental air interface channels.

Figure 7:
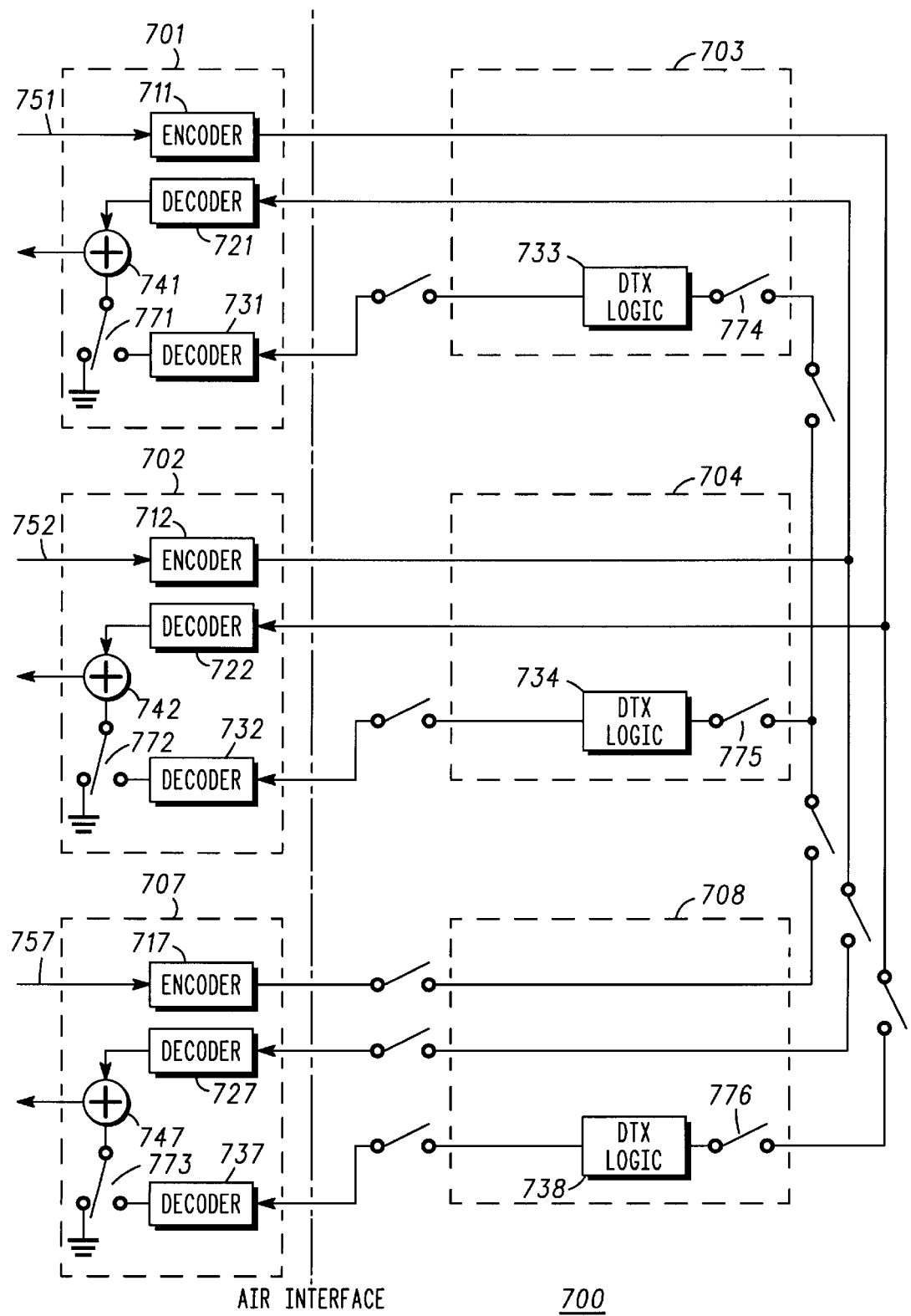
FIG. 7 depicts a three-party conference architecture including a mobile to mobile call prior to including a third-party mobile user in accordance with a further alternate embodiment of the present invention.
Figure 8:
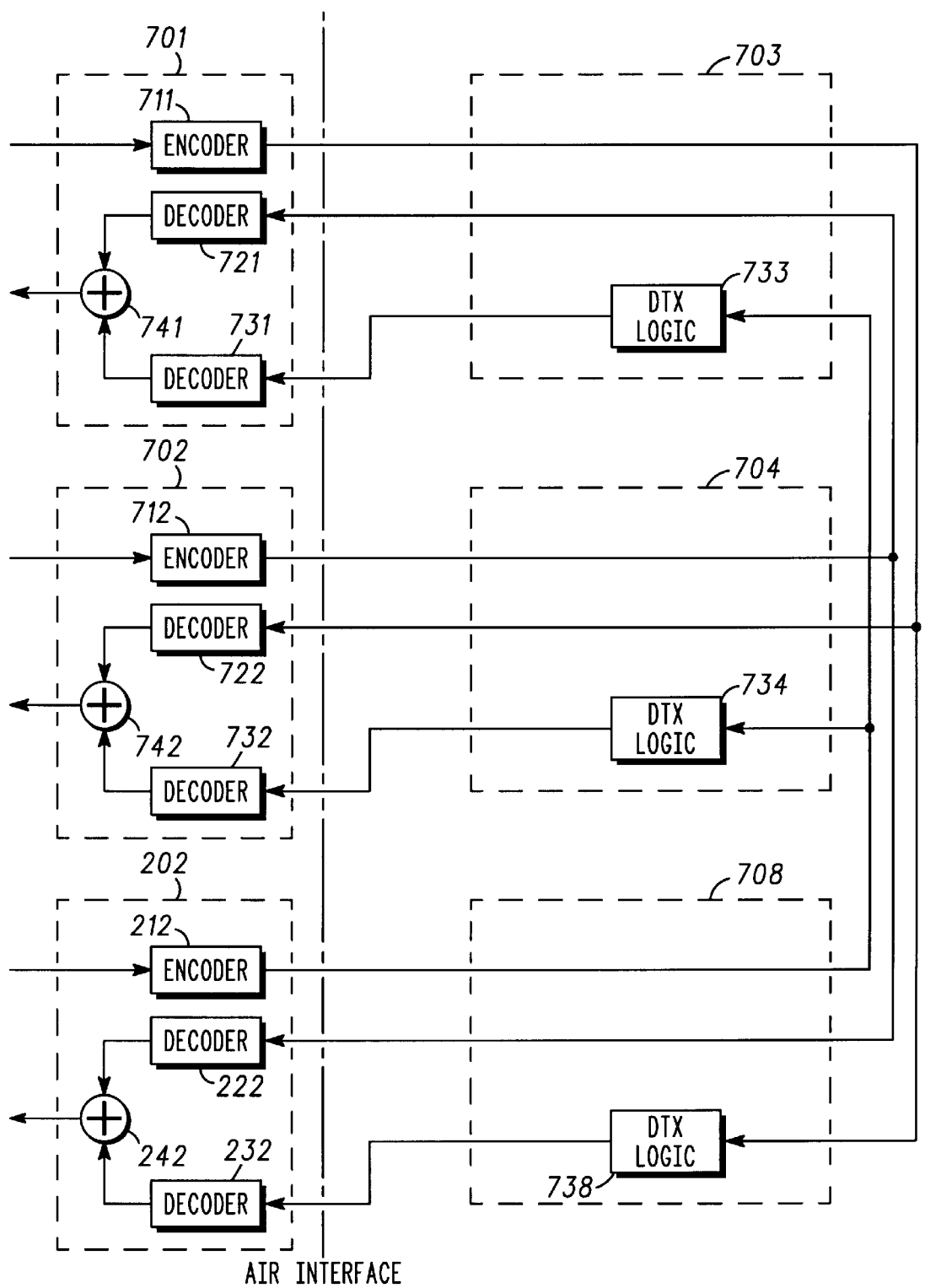
FIG. 8 depicts the three-party conference architecture of FIG. 7 subsequent to including the thirdparty mobile user.

FIGS. 7 and 8 depict a three-party conference system 700 including a mobile-to-mobile call and for including a third-party mobile user. FIG. 7 depicts the system prior to including the user in the communication, and FIG. 8 depicts the three-party conference architecture of FIG. 7 subsequent to including the third-party mobile user.

FIG. 7 depicts system 700 after establishing a communication between first mobile unit 701 and second mobile unit 702 but prior to including a third mobile unit 707 in the communication. System 700 incudes a first mobile unit 701, a second mobile unit 702, a first base unit 703, and a second base unit 704, and a three party conference circuit 705. First base unit 703 and second base unit 704 are preferably channel elements in different base station controllers. In a preferred embodiment, system 700 is a Code Division Multiple Access (CDMA) system. System 700 may also be any digital communication system that includes supplemental air interface channels, such as the next generation CDMA systems.

As depicted in FIG. 7, system 700 depicts a first mobile unit 701 in communication with second mobile unit 702, as is known in the art. First mobile unit 701 encodes voice 751 at encoder 711 and transmits the encoded voice 761 over the air to first base unit 703. This process is well-known in the field of digital RF communications. Encoder 711 is preferably a speech encoder. First base unit 703 receives the encoded input 761 and relays the encoded voice to second base unit 704 through link 706. In a preferred embodiment, link 706 connects a first base station controller with a second base station controller. First base unit 703 and second base unit 704 can alternately be separate channels in the same base station controller, in which case link 706 would be an internal link within the base station controller. Second base unit 704 receives the voice data and transmits the encoded voice data 734 over the air to second mobile unit 702. Second mobile unit 702 decodes the encoded voice data at decoder 722 and outputs the decoded voice 782 to the user of second mobile unit 702.

In the same manner, voice data is transmitted from second mobile unit 702 to first mobile unit 701. Voice 752 is encoded at encoder 712 within second mobile unit 702. Encoder 712 is preferably a speech encoder. The encoded voice data 762 is transmitted over the air to second base unit 704. Second base unit 704 sends the encoded voice data over link 707 to first base unit 703. Link 707 preferably connects the first base station controller with the second base station controller. First base unit 703 and second base unit 704 could also be separate channels in the same base station controller, in which case link 707 would be an internal link within the base station controller. First base unit 703 receives the voice data and transmits the encoded voice data 706 over the air to first mobile unit 701. First mobile unit 701 decodes the encoded voice data 706 at decoder 721 and outputs the decoded voice 781 to the user of first mobile unit 701.

First base unit 703 and second base unit 704 are preferably channel elements in "MOTOROLA SUPERCELL" Base Station Controllers. First base unit 703 includes a decoder 713, an encoder 723, and Discontinuous Transmission (DTX) Logic 733. Second base unit 704 includes a decoder 714, an encoder 724, and Discontinuous Transmission (DTX) Logic 734. Decoders 713 and 714 receive encoded data, preferably from a first mobile unit 701 and a second mobile unit 702, respectively. Decoders 713 and 714 decode encoded data and output unencoded data, such as voice communications. Encoders 723 and 724 receive unencoded inputs and output encoded outputs. Encoders 723 and 724 utilize well-known speech compression algorithms.

First mobile unit 701 includes an encoder 711, a first decoder 721, a second encoder 731, and a combiner 741. Second mobile unit 702 includes an encoder 712, a first decoder 722, a second encoder 732, and a combiner 742. Encoders 711 and 712 receive data, such as voice, and encode the data, using well-known speech compression algorithms, to prepare the voice data for over-the-air transmission. Decoders 721 and 722 receive encoded data, such as encoded voice communications, and output decoded voice transmission to combiners 741 and 742, respectively. Combiners 741 and 742 are effective to receive decoded voice inputs and combine the inputs prior to outputting a combined decoded output.

Figure 9:
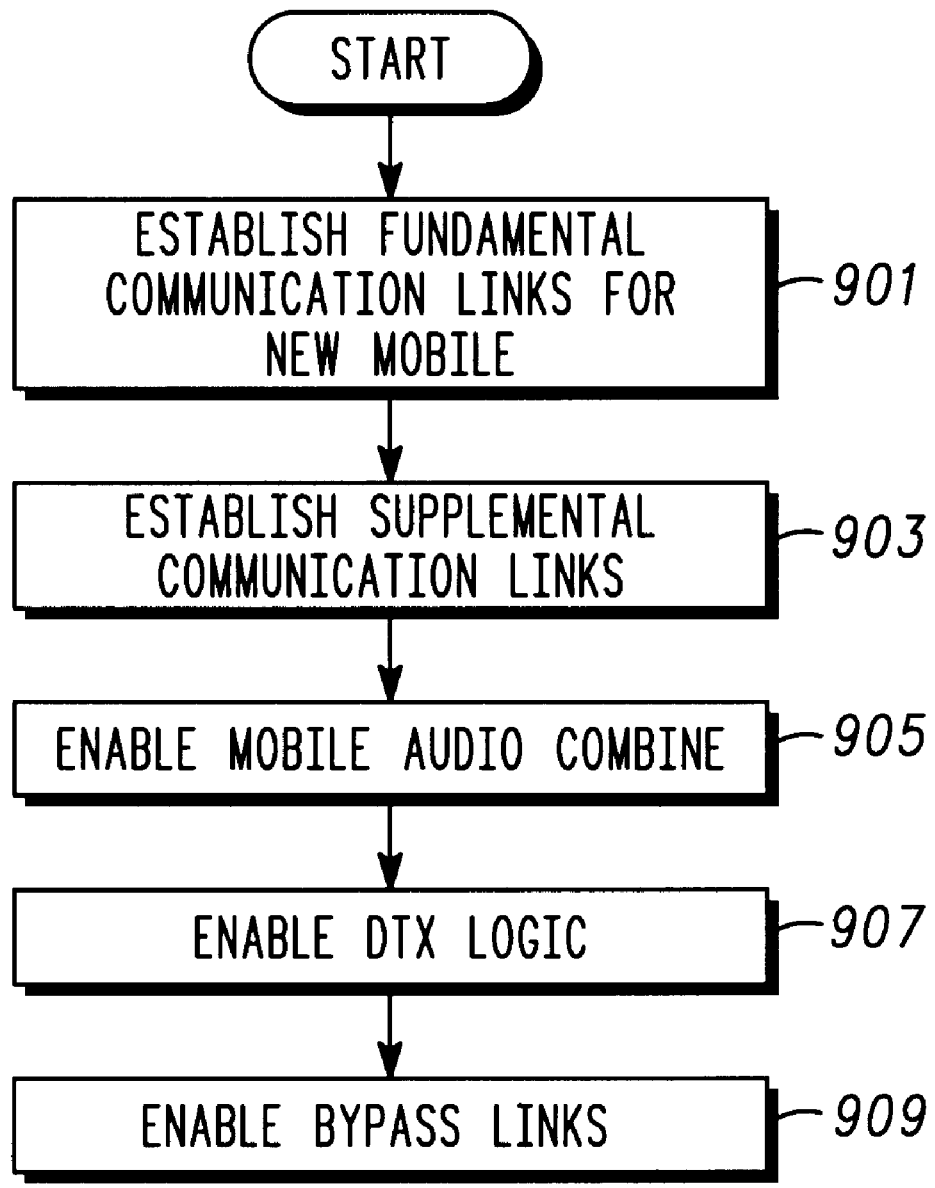
FIG. 9 depicts a flow diagram for including the mobile user in a multi-party communication as depicted in FIGS. 7 and 8.

FIG. 9 depicts a flow diagram for including a third mobile unit in a three-party communication with two mobile units already in communication in accordance with FIG. 7. System 700 establishes (901) fundamental communication links between third mobile unit 707 and third base unit 708 using signaling messages well known in the art. System 700 establishes (903) supplemental communication links between each of the mobile units 701, 702, and 707 and its corresponding base unit 703, 704, and 708, respectively, using signaling messages well known in the art. The mobile units 701, 702, and 707 enable (905) a combiner 741, 742, and 747, respectively, by switching switches 771, 772, and 773, respectively, to a closed position. The base units 703, 704, and 708 enable (907) DTX Logic Units 733, 734, and 738, respectively, by switching switches 774, 775, and 776, respectively, to a closed position. System 700 then enables (909) bypass links.

The three-party communication after adding the third mobile unit is depicted in FIG. 8. First mobile unit 701 receives voice 751 and encodes the voice at encoder 711. The encoded voice is transmitted over the air to first base unit 703. First base unit 703 sends the encoded voice to second base unit 704 and third base unit 708. Second base unit 704 receives the encoded voice communication and passes the encoded voice over the air to second mobile unit 702. Third base unit 707, which has been added as the third-party to the communication, receives the encoded voice signal from first mobile unit 701 and processes the encoded voice signal through DTX Logic Unit 738. The signal output from DTX Logic Unit 738 is transmitted over the air to third mobile unit 707.

Second mobile unit 702 receives voice 752 and encodes the voice at encoder 712. The encoded voice is transmitted over the air to second base unit 704. Second base unit 704 sends the encoded voice to first base unit 703 and third base unit 708. First base unit 703 receives the encoded voice communication and passes the encoded voice over the air to first mobile unit 701. Third base unit 707 receives the encoded voice signal and passes the encoded voice over the air to third mobile unit 707.

Third mobile unit 707 receives voice 757 and encodes the voice at encoder 717. The encoded voice is transmitted over the air to third base unit 708. Third base unit 708 sends the encoded voice to first base unit 703 and second base unit 704. First base unit 703 receives the encoded voice communication and processes through DTX Logic Unit 733. The signal output from DTX Logic Unit 733 is transmitted over the air to first mobile unit 701. Second base unit 704 receives the encoded voice signal and processes through DTX Logic Unit 734. The signal output from DTX Logic Unit 734 is transmitted over the air to second mobile unit 702.

Thus, the present invention provides a method and apparatus for performing a multi-party communication in a communication system. The present invention utilizes supplemental air interface channels on an as-needed basis. The primary purpose of supplemental air interface channels is to allow for the increased bandwidth requirements for high speed data services. However, the present invention provides an architecture that utilizes the supplemental air interface channels to improve voice quality in multi-party calls with minimal or no impact to air interface or Code Division Multiple Access (CDMA) system capacity.

The present invention provides the ability to utilize supplemental air interface channels to carry the additional forward link voice channels required in a multi-party call. The mobile unit includes a plurality of decoders that decode the voice, and a combiner that combines the decoded voice. In the present invention, the supplemental air interface channels are not required for reverse link communication.

The present invention also improves voice quality by eliminating multiple speech compression algorithms. By using the supplemental air interface channels, the voice from a mobile user only has to be encoded and decoded once, thereby eliminating the second encoding and decoding associated with prior art multi-party conference architecture. By eliminating the second speech compression algorithm, the voice quality is enhanced.

In addition, the present invention provides for improved voice quality by inputting a single input into the speech encoders. The compression algorithms used by the speech decoders typically are modeled using a single voice. Since the present invention only inputs a single input to the speech encoders, the problem of multiple inputs into a speech encoder is removed.

A further improvement over the prior art is the decreasing of delay due to the removal of delay that is associated with multiple encoding/decoding steps. Since the present invention removes one of the encoding/decoding steps associated with prior art systems, the gaps in the audio when switching from vocoder bypass to three-party conferencing mode is lessened.

While this invention has been described in terms of certain examples thereof, it is not intended that it be limited to the above description, but rather only to the extent set forth in the claims that follow.

I claim:

1. A method for performing a multi-party communication in a communication system, the communication system including a first base unit in communication with a first mobile unit and a second base unit in communication with a second mobile unit, the first base unit and the second base unit including a decoder, an encoder and a logic unit, the method comprising:

initiating a communication between the first mobile unit and the second mobile unit;

bypassing the decoder and the encoder in the first base unit by speech packets sent between the first mobile unit and the second mobile unit;

determining a need to include a third communication unit in the communication; and adding the third communication unit to the communication, wherein the speech packets sent between the first mobile unit and the second mobile unit continue to bypass the decoder and the encoder in the first base unit.

2. A method for performing a multi-party communication in a communication system in accordance with claim 1, wherein the third communication unit generates a signal, and wherein the second mobile unit generates a signal, the method further comprising the steps of:

decoding the signal from the third communication unit at a first decoder in the first mobile unit; and decoding the signal from the second mobile unit at a second decoder in the first mobile unit.

3. A method for performing a multi-party communication in a communication system in accordance with claim 2, wherein the first decoder produces a first decoded output, and wherein the second decoder produces a second decoded output, the method further comprising the step of combining the first decoded output and the second decoded output in the first mobile unit.

4. A method for performing a multi-party communication in a communication system in accordance with claim 1, further comprising the steps of:

decoding a signal from the third communication unit at a first decoder in the second mobile unit; and decoding a signal from the first mobile unit at a second decoder in the second mobile unit.

5. A method for performing a multi-party communication in a communication system in accordance with claim 4, wherein the first decoder produces a first decoded output, and wherein the second decoder produces a second decoded output, the method further comprising the step of combining the first decoded output and the second decoded output in the second mobile unit.

6. A method for performing a multi-party communication in a communication system in accordance with claim 1, wherein the third communication unit is added to the communication on a supplemental air interface channel.

7. A method for performing a multi-party communication in a communication system in accordance with claim 1, wherein the third communication unit is a third mobile unit in communication with a third base unit, the method further comprising the steps of:

decoding a signal from the first mobile unit at a first decoder in the third communication unit; and decoding a signal from the second mobile unit at a second decoder in the third communication unit.

8. A method for performing a multi-party communication in a communication system in accordance with claim 7, wherein the first decoder produces a first decoded output, and wherein the second decoder produces a second decoded output, the method further comprising the step of combining the first decoded output and the second decoded output in the third mobile unit.

9. A method for performing a multi-party communication in a communication system in accordance with claim 1, the method further comprising the steps of:

receiving a speech packet from the second mobile unit at the first base unit; and determining a need to dekey the transmitter of the first base unit based at least in part upon the speech packet.

10. A method for performing a multi-party communication in a communication system in accordance with claim 9, wherein the step of determining a need to dekey the transmitter comprises determining if the speech packet includes less than a predetermined number of bits.

11. A method for performing a multi-party communication in a communication system in accordance with claim 9, wherein the step of determining a need to dekey the transmitter comprises the steps of:

determining an encoding rate of the speech packet; and comparing the encoding rate to a pre-determined rate.

12. A method for performing a multi-party communication in a communication system in accordance with claim 1, wherein the third communication unit is a fixed communication unit coupled to a Public Switched Telephone Network, the method further comprising the steps of:

decoding a first signal from the first mobile unit at a first decoder in the first base unit to produce a first decoded output;

decoding a second signal from the second base unit at a first decoder in the second base unit to produce a second decoded output;

combining the first decoded output and the second decoded output to produce a combined output; and transmitting the combined output to the fixed communication unit.

13. A method for performing a multi-party communication in a communication system in accordance with claim 12, wherein the third communication unit produces a speech signal, the method further comprising the steps of:

encoding the speech signal at a first speech encoder in the first base unit; and encoding the speech signal at a first speech encoder in the second base unit.

14. A method for performing a multi-party communication in a communication system, the communication system including a first base unit in communication with a first mobile unit and a fixed communication unit, the first base unit including a decoder, an encoder and a logic unit, and the fixed communication unit being connected to a Public Switched Telephone Network, the method comprising the steps of:

initiating a communication between the first mobile unit and the fixed communication unit;

decoding speech packets from the first mobile unit by the decoder;

encoding an unencoded speech communication signal from the fixed communication unit by the encoder;

determining a need to include a second mobile unit in the communication, the second mobile unit being in communication with a second base unit; and adding the second mobile unit to the communication, wherein the first mobile unit and the second mobile unit transfer speech packets therebetween by bypassing the decoder and the encoder in the first base unit.

15. A method for performing a multi-party communication in a communication system in accordance with claim 14, wherein the fixed communication unit produces a signal, the method further comprising the steps of:

encoding the signal from the fixed communication unit at an encoder in the first base unit to produce a first encoded signal;

decoding the first encoded signal from the first base unit at a first decoder in the first mobile unit to produce a first output; and decoding the signal from the second mobile unit at a second decoder in the first mobile unit to produce a second output.

16. A method for performing a multi-party communication in a communication system in accordance with claim 15, the method further comprising the step of combining the first output and the second output in the first mobile unit.

17. A method for performing a multi-party communication in a communication system in accordance with claim 14, wherein the fixed communication unit produces a signal, the method further comprising the steps of:

encoding the signal from the fixed communication unit at an encoder in the second base unit to produce a first encoded signal;

decoding the first encoded signal from the second base unit at a first decoder in the second mobile unit to produce a first output; and decoding the signal from the first mobile unit at a second decoder in the second mobile unit to produce a second output.

18. A method for performing a multi-party communication in a communication system in accordance with claim 17, the method further comprising the step of combining the first output and the second output in the second mobile unit.

19. A method for performing a multi-party communication in a communication system in accordance with claim 14, wherein the step of bypassing the encoder in the first base unit further comprises the steps of:

passing the speech packets from the second mobile unit through the logic unit, the speech packets being passed at a data rate; and determining a need to dekey the transmitter of the first base unit based on the data rate of the speech packets.

20. A method for performing a multi-party communication in a communication system in accordance with claim 14, the method further comprising the steps of:

decoding a signal from the first mobile unit at the decoder in the first base unit to generate a first decoded output;

decoding a signal from the second mobile unit at a decoder in the second base unit to generate a second decoded output;

combining the first decoded output and the second decoded output to form a combined output; and transmitting the combined output to the fixed communication unit.

21. An apparatus comprising:

a decoder having an encoded uplink communication signal transmitted from a remote unit as an input and an output comprising a decoded uplink communication signal;

circuitry for receiving the encoded uplink communication signal and outputting the encoded uplink communication signal;

an encoder for receiving an unencoded downlink communication signal and outputting a first encoded downlink communication signal; and a logic unit for receiving a second encoded downlink communication signal and outputting the second encoded downlink communication signal.

22. An apparatus in accordance with claim 21, wherein the logic unit performs discontinuous transmission of the second encoded downlink communication signal.

23. An apparatus in accordance with claim 22, further comprising a transmitter.

24. An apparatus in accordance with claim 23, further comprising circuitry for selectively dekeying the transmitter.

25. An apparatus in accordance with claim 21, further comprising a three party conference circuit for connection to a Public Switched Telephone Network and including a combiner for receiving the decoded uplink communication signal for use by a fixed communication unit and a broadcast channel for outputting the unencoded downlink communication signal to the encoder.

26. An apparatus in accordance with claim 21, wherein the apparatus further comprises a transmitter, and wherein the logic unit receives a speech packet from a mobile unit and determines a need to dekey the transmitter if the speech packet includes less than a predetermined number of bits.

27. A communication system comprising:

a first base unit comprising:

a decoder having an encoded uplink communication signal transmitted from a remote unit as an input and an output comprising a decoded uplink communication signal;

circuitry for receiving the encoded uplink communication signal and outputting the encoded uplink communication signal;

an encoder for receiving an unencoded downlink communication signal and outputting a first encoded downlink communication signal; and a logic unit for receiving a second encoded downlink communication signal and outputting the second encoded downlink communication signal;

a second base unit comprising:

a second decoder having a second encoded uplink communication signal transmitted from a second remote unit as an input and an output comprising a second decoded uplink communication signal;

circuitry for receiving the second encoded uplink communication signal and outputting the second encoded uplink communication signal;

an encoder for receiving an unencoded downlink communication signal and outputting a second encoded downlink communication signal; and a logic unit for receiving the encoded uplink communication signal and outputting the encoded downlink communication signal; and a three party conference circuit for connection to a Public Switched Telephone Network and including a combiner for receiving the decoded uplink communication signal for use by a wireline telephone and a broadcast channel for outputting the unencoded downlink communication signal.

\* \* \* \* \*